United States Patent Office 3,449,530
Patented June 10, 1969

3,449,530

APPARATUS FOR ELIMINATING TONE BURST SIGNALS IN AUDIO CIRCUITS OF TAPE RECORDERS

Jefferson L. Watts, Statesville, and John W. Coffman III, Greensboro, N.C., assignors to Greensboro Electronics, Inc., Greensboro, N.C., a corporation of North Carolina Filed Oct. 1, 1964, Ser. No. 400,841
Int. Cl. G11b 5/78, 27/36
U.S. Cl. 179—100.2 3 Claims

ABSTRACT OF THE DISCLOSURE

A multiple channel amplifying device with at least two audio channels and a third cue channel for controlling the audio channels by normally audible tone bursts wherein the tone bursts are eliminated from the outputs of the audio channels by isolating the cue signals from program signals, amplifying and rectifying the cue signals and subsequently using these signals to bias control tubes to cut off or stop the operation of an actuating mechanism.

In the communications field it is acknowledged that a most undesirable characteristic of prerecorder tape cartridges used commercially on broadcasting stations and broadcasting equipment is the presence of tone bursts or cue signals in the audio output circuits which are customarily utilized to halt the cartridge upon completion of the recorded tract. The increasing popularity and utility of stereophonic sound and particularly stereophonic tape recorders have placed an even greater emphasis on fidelity, and consequently much effort has been expended to eliminate these undesirable cue signals or tone bursts. An acknowledged method in use in the communications industry at this time is one of using a second tract on an individual tape as a cue or control circuit and applying signals on that additional tract to halt the movement of the tape being broadcast when such an operation is desired. The drawbacks to such a system are obvious in that more expensive equipment is required to cooperatively control and operate this second tract as a cue circuit. Such a circuit requires additional equipment for its specific function as an integral part of the entire apparatus and results are not always as desired in that there is some across tract reception due to the unevenness of tape movement through the pick-up or signal sensing mechanisms. As the demand for multiple tracts on individual tapes becomes greater, the increase in maintaining such a system efficiently and precisely operative is financial proportional to the additional equipment required. To improve and perfect a system which will accomplish the same result and to avoid the use of extremely expensive components to maintain that system, the present invention is offered and disclosed as a far more desirable alternative which is simple in operation and inexpensive in maintenance. The method for eliminating these tone burst signals encompasses elementary principles and can be performed by any one of several devices to be subsequently described.

By the use of a sampling circuit interposed between and in conjunction with the dual input channels of a normal stereo tape recorder, composite signals are sampled, differentiated and amplified through the sampling circuit, which is actually the cue circuit since cue signals are the only signals passed, and re-injected into the audio output circuits at points remote from the input and positioned electrically so as to offer positive control over the output channels. Signal reception is varied from that customarily used in that a phase variation is applied, i.e., the program signals of each individual input channel are inverted one from the other so that program signals in one input channel are 180° out of phase from program signals in the other channel. The cue signals carried by both input channels are in phase with one another. Normal broadcasting involves passage of only program signals. When the recorded tract reaches its termination point, cue signals are injected in the input channels along with the program signals still passing. When all of these composite signals are sampled in the cue control circuit, the out-of-phase program signals are eliminated and the in-phase signals are passed so as to offer positive control means for biasing tubes in the audio output stages of both tape recorder channels.

Essentially the result is a multiple channel amplifier with two audio channels and a third sampling or cue channel functioning as a result of composite mixing of signals carried by the two audio channels. The control signals or cue signals are eliminated from the output circuit of either or both of the audio channels by virtue of shorting or cancelling signals, depending upon the phase relationships, or by electrical squelch principles. The sampling channel or cue channel will automatically stop a tape recorder actuating mechanism by a tone or any other signal which can be amplified, and thereby instantaneously stop the movement of the tape. This cue channel will stop, start or control other internal, external or combination electrical or mechanical circuits or devices. A combination of all three channels, or a combination of any two channels, or any one of the three channels separately, will stop, start, or control other internal or external electrical or mechanical circuits or devices. A combination of all three channels, or a combination of any two channels, or any one of the three channels separately, will stop, or start, or control other internal or external electrical or mechanical circuits or devices. The cue channel can be used also as a third and independent channel. It is obvious that the electronic principles involved herein with tape recorders can be utilized on telephone loop circuits to eliminate control signals from any program signals on the telephone loop. These same principles can also be applied in two-way radio circuits and systems to eliminate control signals from any program signals. The same electronic principles obviously can be used on any monaural channel device as well as devices similar to those described herein. Broadly and generally stated, these principles can be used to eliminate any unwanted program signals from any program signals regardless of the source of such signals.

The composite parts of this multiple channel tape recorder and cue circuit can be housed on or within a conventional chassis, either metal or printed circuit. The physical location of the circuit elements and composite parts is in accordance with standard electronic engineering and construction practices, and the respective position of each composite part is ascertainable by reference to the drawings described below. Obviously the physical location of the circuit elements and composite parts can be varied as long as the resultant apparatus is assembled and operated in accordance with standard engineering practice. The composite parts of the disclosed devices may be varied as to tube or transistor type, size and ratings as each particular application requires. The composite parts of the preferred embodiment of a multiple channel tape recorder and cue circuit and the respective function or functions of each of these parts are now broadly summarized.

There are two input stages, one in channel 1 and the other in channel 2. As magnetic tape is drawn across each of the two input stage tape heads or signal sensing devices, a voltage directly proportional to the signal recorded on the tape is induced across the winding of each head. Signals may be applied to the tape in any manner that will apply signals in desired phase and amplitude relationships. Program signals to be passed through amplification channels should be out of phase. Cue signals to be eliminated from program channels should be in phase. The signals received by each channel are composed of two composite signals. Channel 1 receives and carries the cue signals plus the program signals, and channel 2, the cue signals less or minus the program signals.

A sample of signals in channel 1 is taken from the output of that channel's amplifier stage and directed to the balanced modulator circuit. Similarly, a sample of signals in channel 2 is taken from the output of that channel's amplifier stage and applied to the balanced modulator which works the initial stage of the cue circuit. The samples from channels 1 and 2 are combined in the balanced modulator, differentiated and selectively applied to a subsequent amplifier. The balanced modulator circuit by virtue of its design will eliminate out-of-phase program signals from passage therethrough. The remaining signals are then amplified by the subsequent amplifier stage in the cue circuit. These signals are then rectified. The resulting direct current voltage is then applied to the grid of a tube or transistor which is normally biased beyond cut-off and consequently maintained in a non-conducting condition. When the direct current voltage is applied to the grid of this tube, the tube is biased to a conducting condition. This biasing operation accomplishes a reverse biasing on a tube or transistor gating each audio output circuit of the tape recorder channels. This reverse biasing operates to prevent the audio output circuits from conducting and eliminates the cue or tone burst signals from appearing as audible emissions at cooperating speakers. A separate biasing operation applies the passed signal from the balanced modulator to a gating device which energizes a relay that operates the tape recorder actuating mechanism. When the relay is energized by the biasing operation of the tube, and operates the recorder actuator mechanism, the movement of the tape stops.

One of the principal objects of the present invention is to provide a multiple channel amplifier having at least two audio channels and a third channel called a cue channel which will eliminate tone burst or cue signals from appearing as audible emissions.

Another object of the present disclosure is to offer alternative devices for accomplishing the elimination of tone burst or cue signals from the audio output of tape recorder playback circuits.

Still another object of the present invention is to offer a method that may be followed with any number of devices and application of devices to eliminate tone burst or cue signals from the audio outputs of tape recorder playback circuits.

Yet another object of this invention is to offer a tone burst elimination method and devices for use in telephone loop circuits and two-way radio circuits.

A further object of the present invention is to offer a device that will in addition to eliminating tone burst or cue signals from audio outputs of tape recorder playback circuits also afford stop, start or control means for other internal or external electrical or mechanical or combination thereof circuits or devices.

Yet still another object of the present invention is to offer a device and method that can be utilized on or with any nonaural or multiple channel device or devices.

A further object of the present invention is to offer a device and method that can be used to eliminate any unwanted program signals from any program signals regardless of the source of such signals.

These and other objects and advantages of the present invention will be apparent from the following description of the tone burst eliminating method and apparatus wherein.

Figure 5:
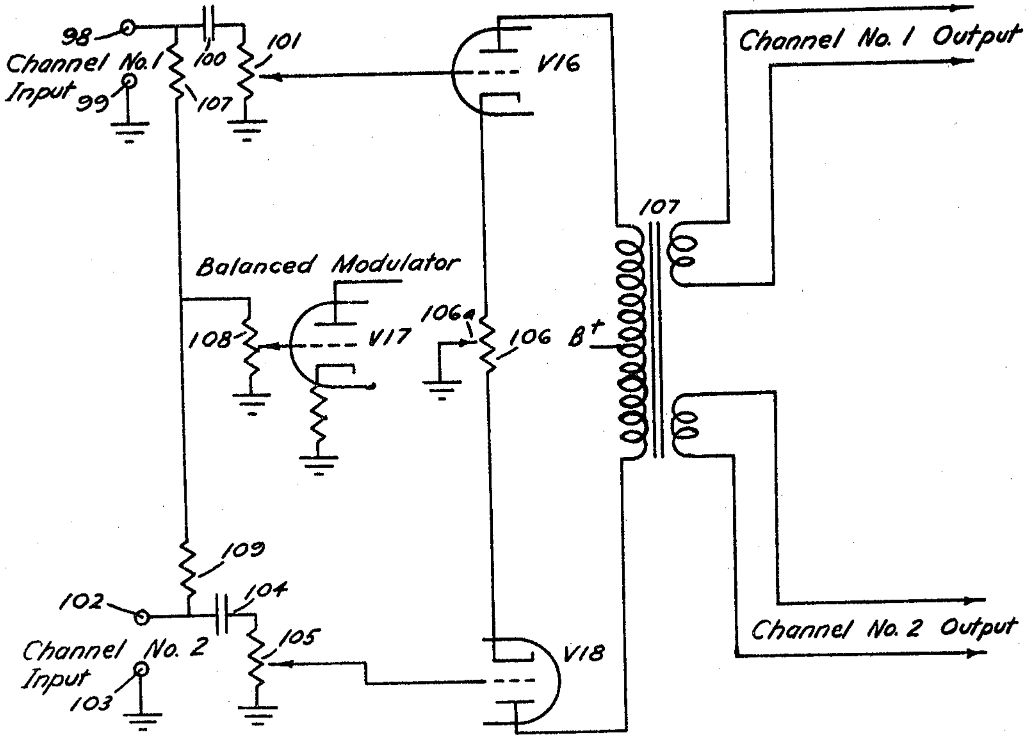
Figure 6:
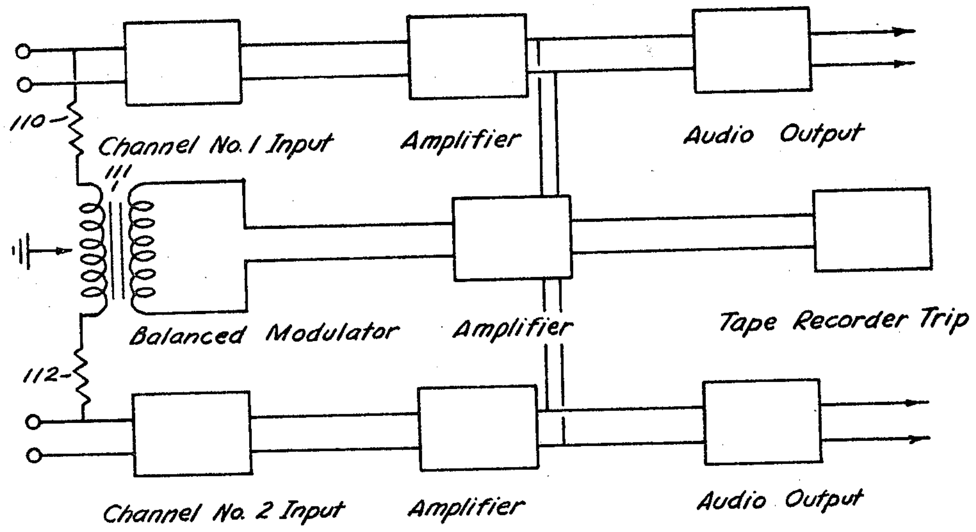

FIGURE 5 is still another alternative circuit for eliminating the tone burst or cue signals in audio output circuits of tape recorders using an individualized transformer secondary as output circuits; and FIGURE 6 is another block diagram showing an alternative balanced modulator circuit utilizing a simple transformer with one end of its secondary grounded as the actuating device for tone burst signal elimination.

While this invention shall be particularly described herein with specific reference to tape recorder playback circuits, it is to be understood that it is readily adaptable to other devices such as telephone circuits and two-way radio systems.

In describing the preferred embodiment of the invention, details of the primary or preferred method and apparatus for eliminating tone burst signals will be particularly pointed out while alternative apparatus will be discussed in detail only with regard to those circuit components that reflect a distinguishing feature over the preferred device.

There is in channel 1 a conventional tape head or signal sensing mechanism which induces a voltage within a self-contained coil directly proportional to the signal received. This tape head can, of course, consist of one or a plurality of one-quarter inch tract sensing devices, none of which are novel in the electronics industry. Either of the tracts is connected through relay 10 (FIGURE 1), provided that the machine is in the playback mode of operation, and through condenser 11 to the base 12 of the transistor V1. A resistor 13 is connected from the base of transistor V1 to ground, and a resistor 14 is connected between the base and collector of that transistor. Resistor 15 and condenser 16 are connected in a parallel, one end of that resistor being connected to the emitter of transistor V1 and the other end being joined to one end of resistor 17. Resistor 17 is then grounded. The base of transistor V2 is connected to the collector of transistor V1. Resistor 18 is connected from the base of transistor V2 to the junction of condenser 19 and resistor 20, condenser 19 then being grounded 21. Resistor 22 is connected from the junction of resistors 15 and 17 to one end of condenser 23. The second end of condenser 23 is connected to the collector of transistor V2. Resistor 24 is connected from the emitter of transistor V2 to the junction of resistor 25 and condenser 26, with the second end of resistor 25 connected to ground. Condenser 26 is connected across that resistor. Condenser 27 is connected from the emitter of transistor V2 to ground. Resistor 28 is connected from the collector of transistor V2 to the junction of resistor 20 and condenser 29. One terminal of that condenser is connected to ground while the second terminal is connected to the power supply of —22 volts. Condenser 30 is connected from the collector of transistor V2 to the base of transistor V3. Resistor 31 is connected from the base of transistor V3 to ground and resistor 32 is connected from the emitter of transistor V3 to ground. Resistor 33 is connected from the collector of transistor V3 to the power supply of —22 volts. A condenser 34 is connected from the collector of transistor V3 to the anode end of diode 35. The cathode end of that diode is connected to a terminal of condenser 36, the other end of that condenser being connected to resistor 37 which is in turn grounded. The output of channel 1 is then taken across resistor 37.

Channel 2 is a duplicate of channel 1 and will not be described element by element as was done above. When references are made to components of channel 2, characters will be followed by —2 to identify elements of that channel.

Figure 1:
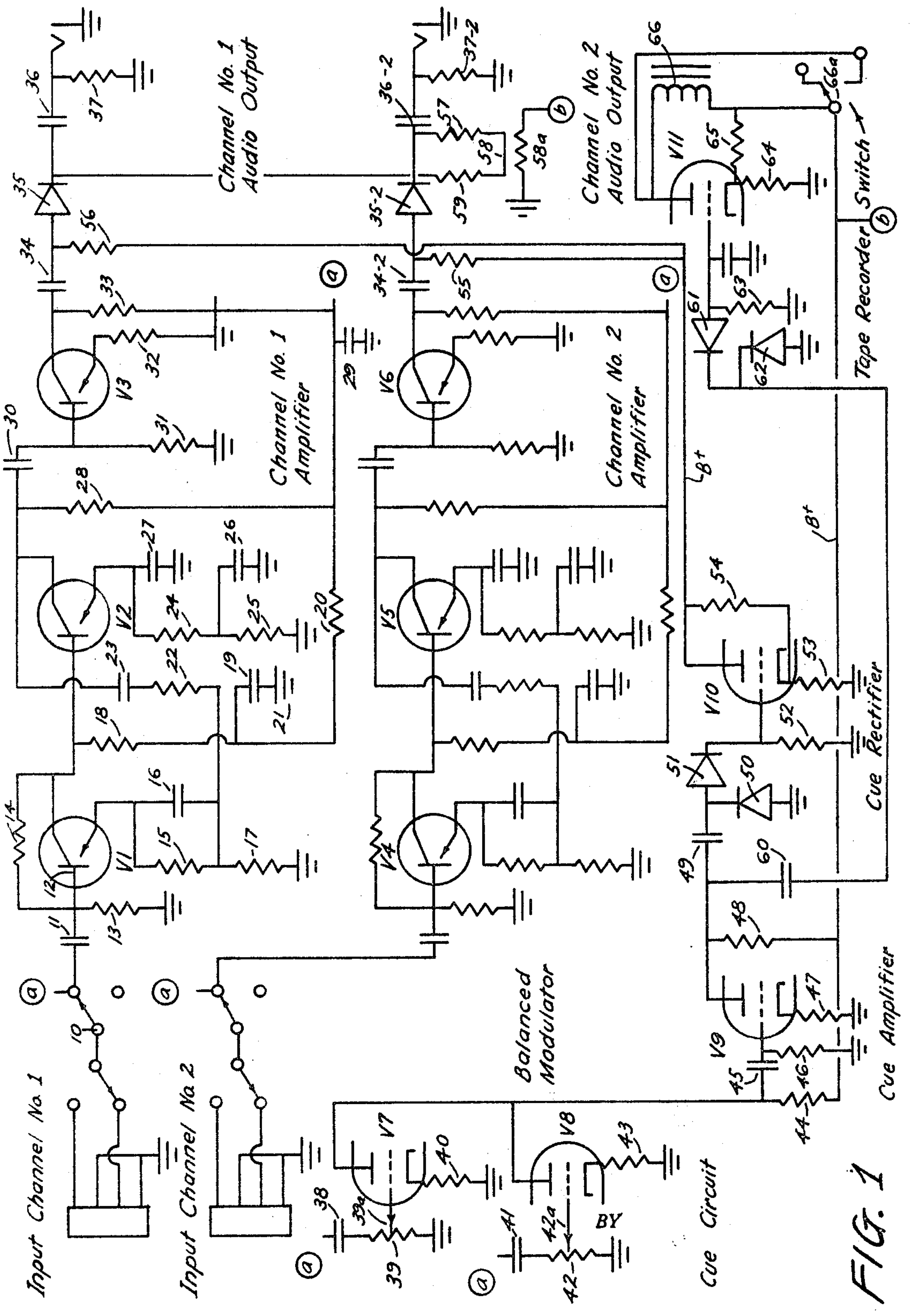
FIGURE 1 is a circuit diagram of the preferred embodiment of the tone burst or cue signal eliminating device showing input circuits, amplifier stages and audio output stages of tape recorder channels 1 and 2 and the cue circuit composed of a balanced modulator, amplifier, stage rectifier and switch for control of the tape recorder actuating mechanism.

The cue circuit or control circuit has the following configuration. One end of a condenser 38 is connected to the base of transistor V3. The other end of that condenser is connected to the top of resistor 39 as shown in FIGURE 1 while the other end is connected to ground. A movable contact 39*a* is connected to the grid of tube V7, and a resistor 40 is connected from the cathode of that tube to ground. Condenser 41 is similarly connected from the base of transistor V6 to resistor 42 which is in turn grounded. A movable contact 42*a* is connected to the grid of tube V8, and a resistor 43 is connected from the cathode of that tube to ground. The plate of tube V7 is paralleled with the plate of tube V8. Resistors 40 and 43 are connected from the cathodes of tubes V7 and V8 to ground. A resistor 44 is connected from the paralleled plates of tubes V7 and V8 to the power supply (B+). Condenser 45 is then interposed between the plate circuit of tubes V7 and V8 to the grid of tube V9. Resistor 46 is positioned between the cathode of tube V9 to ground. Resistor 48 is connected from the plate of tube V9 to the power supply (B+). A condenser 49 is connected from the plate of tube V9 to the junction of diodes 50 and 51 (cathode ends), the anode of diode 50 then being connected to ground. The anode of diode 51 is wired to the grid of tube V10. Resistor 52 is connected from the grid of tube V10 to ground, and a resistor 53 is connected from the cathode of that tube to ground. Resistor 54 is wired from the cathode of tube V10 to the power supply (B+). A resistor 56 is connected from the plate of tube 10 to channel 1. Resistor 57 is connected from the junction of diode 35–2 (cathode end) and condenser 36–2 to the movable contact of resistor 58*a*, while resistor 59 is connected between the junction of diode 35 and condenser 36 to the movable contact 58 of resistor 58*a*. One side of resistor 58 is connected to ground while the other end goes to the power supply (B+). Condenser 60 is connected from the plate of tube V9 to the junction of diodes 61 and 62 (cathode ends). The anode of diode 61 is connected to the grid of tube V11, and the anode of diode 62 is grounded. Resistor 63 is the grid resistor for the tube V11 and resistor 64 is connected from the cathode of the V11 to ground. Resistor 65 is positioned from the cathode of tube V11 to the power supply (B+). The coil of relay 66 is wired between the plate of tube V11 and the power supply (B+).

The power supply recommended for use with this unit is a conventional full wave rectifier. Obvious modifications and adaptations of other type power supplies, of course, are not to be precluded from use with this or similar devices.

The input of channels 1 and 2 as designated in FIGURE 1 represent the tape head or signal sensing means. As magnetic tape is pulsed or drawn across the tape head of each input a voltage directly proportional to the signal recorded on the tape is induced across the windings of each head. Signals may be applied to the tapes in any manner that accomplishes signal application in proper phase and amplitude relationship. Program signals to be passed through amplification channels should be out-of-phase when the apparatus illustrated in FIGURE 1 is utilized. Cue signals to be eliminated from program channels should be in-phase when using this same apparatus. These program and cue signals are composed of two composite signals, channel 1 being the cue signals plus the program signals and channel 2 being the cue signals minus the program signals. Illustrating the operation of the circuit shown in FIGURE 1, the composite signal from the input of channel 1 is applied to the base of transistor V1 through relay 10 and condenser 11. Transistors V1, V2 and V3 compose an amplifier that conforms to the National Association of Broadcasters' Standards. Other amplifiers including but not limited to tube type or semi-conductor type which are constructed and designed in accordance with the necessary and required power for tape playback may be utilized rather than those herein described. The signal is coupled from the collector of transistor V3 through condenser 34 and diode 35 (provided diode 35 is biased in a forward direction), and condenser 36 is applied acros resistor 37. The output signals of channel 1 is taken across resistor 37.

Channel 2 and the accompanying circuitry represents an exact duplication of channel 1 and will not be specifically described as was done above.

In the operation of the apparatus illustrated in FIGURE 1, a sample of signals in channel 1 is taken from the base of transistor V3 and applied to the grid of tube V7. Similarly, a sample of signals in channel 2 is taken from the base of transistor V6 and applied to the grid of tube V8. The samples from the two channels are combined in the plate circuits of tubes V7 and V8 and applied to the grid of tube V9. Tubes V7 and V8 compose a balanced modulator circuit which by its design will eliminate out-of-phase signals, in this instance program signals, from its output circuit. The in-phase signals, once passed, are further amplified by tube V9 and are coupled through condenser 49 to diodes 50 and 51. These diodes rectify the signal and apply the resulting direct current voltage to the grid of tube V10. Tube V10 is normally biased beyond cut-off with no current flowing in the plate circuit. When a direct current voltage is applied to the grid of tube V10 by diode 51, the tube is instantaneously biased to a conducting condition. This in turn applies a reverse bias upon diode 35 and 35–2 (channel 2) through resistor 56 and resistor 55 respectively. This reverse bias applied to diode 35 and 35–2 prevents these diodes from conducting and thereby eliminates the cue signals or tone burst signals from appearing across resistor 37 and 37–2 which is the output of channel 1 and channel 2 respectively.

Signals appearing at the plate of tube V9 are coupled through condenser 60 to diodes 61 and 62. These diodes rectify the signals and apply the resulting direct current voltage to the grid of tube V11. Tube V11 is normally biased beyond cut off. When the direct current voltage is applied to the grid by diode 61, the tube is instantaneously biased in a conducting condition thus energizing relay 66. When relay 66 is energized switch 66*a* operates and tape movement ceases.

The simplicity of the apparatus illustrated in FIGURE 1 makes it possible to utilize a multitude of various circuit elements in one or more applications to accomplish the same result by following the suggested method. Tubes and semi-conductors normally maintained at a beyond cut-off bias and being actuated when a positive voltage is applied to overcome this cut-off bias, may be reversed and normally operated in a conducting condition. When a passed cue signal is applied to the grid of these normally biased for plate current flow devices, the effect is to interrupt tube conduction by applying an opposite grid voltage to that normally maintained. Various other operations may be performed which will result in the same tone burst elimination by operating the diodes in a reverse manner. Many variations of the basic apparatus are contemplated, and no attempt will be made to discuss in detail each and every alternative. A random sampling of preferred alternative devices for performing the general method of operation will be included in this disclosure, and substantial modifications and alterations of the preferred apparatus of FIGURE 1 will be specifically pointed out.

Figure 2:
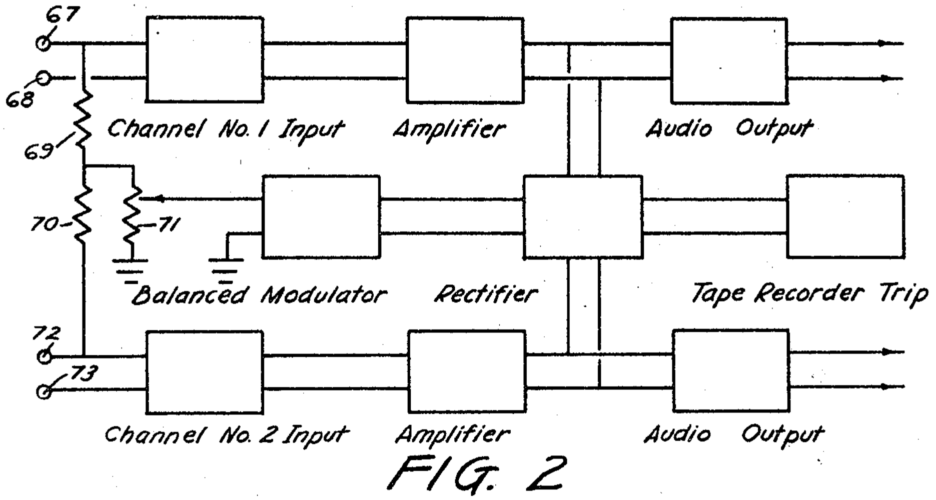
FIGURE 2 is a block diagram of the circuit of FIGURE 1 showing an alternative balanced modulator circuit utilizing a tripod junction of three resistors to pass in-phase signals and eliminate out-of-phase signals.

FIGURE 2 represents an alternative apparatus for eliminating cue or tone burst signals where a simplified balanced modulator circuit has been substituted within the basic apparatus of FIGURE 1. Here again, signals may be applied to this apparatus in any way that will convey signals to inputs in proper phase and amplitude relationships. Program signals to be passed through channel 1 should be out of phase with program signals to be passed through channel 2, and cue signals to be eliminated from these program channels should be in phase, one channel with the other. The channels each carry composite signals. Channel 1 carries cue signals plus program signals, and channel 2 carries cue signals minus program signals. These signals are applied to channel 1 at input terminals 67 and 68 (FIGURE 2) and to channel 2 at terminals 72 and 73. From these input terminals program signals are canceled across resistors 69 and 70 because these program signals are out of phase. They will, therefore, not appear across resistor 71. However, program signals applied between terminals 67 and 68 will appear within channel 1 circuitry, be amplified in a conventional manner, be passed through the entire channel 1 circuit components and appear at the audio output as audible emissions. In the same manner, signals applied to terminals 72 and 73 will appear within channel 2 circuitry, be amplified, be passed through channel 2 circuit elements and appear at that channel's audio output. In-phase signals, in this instance cue signals, applied between terminals 67 and 68 and 72 and 73 will appear across resistor 71. They will not be canceled through resistors 69 and 70 since these signals are in phase. Signals that appear across resistor 71 will be amplified and rectified by circuit components for cue circuit control similar to those described above for the apparatus illustrated in FIGURE 1. A biasing operation will cause a relay to be energized, and once this energization is complete the relay contacts will cause the tape recording mechanism to stop, thereby instantaneously stopping the movement of the tape and any other internal or external mechanical or electrical device wired thereto.

In-phase signals, in this instance cue signals, can be used to ground the grids of gating or control tubes or semi-conductors in the audio output stages of each channel thereby preventing these tubes and semi-conductors from passing signals and thus eliminating the in-phase cue signals from the out-of-phase program signals appearing at the audio output. No in-phase cue signals whatsoever will appear in the outputs of either of the two program channels.

It is obvious that rather than the grid grounding technique utilized by the apparatus in FIGURE 2, the simpler principle of applying cue signals having one phase relationship against cue signals passing through the normal audio channels and having the opposite phase relationship on the grids of the final tubes or semi-conductors in the audio output stages would contribute an equally efficient operation.

Figure 3:
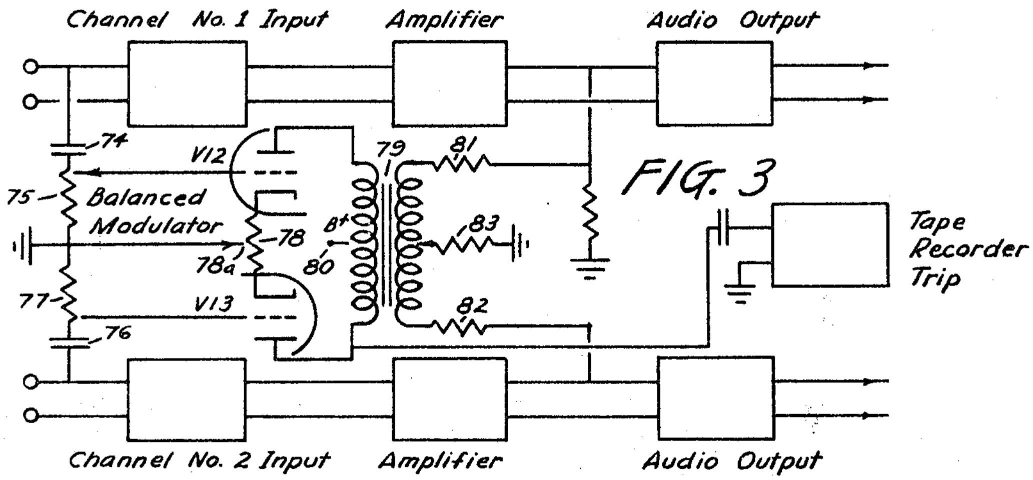
FIGURE 3 is a block diagram showing another alternative balanced modulator circuit utilizing a transformer with a center tap grounded secondary.

FIGURE 3 illustrates another alternative apparatus for eliminating cue or tone burst signals, this device offering another variation of a balanced modulator circuit in that a transformer primary is used as the plate circuit load. Here the cue channel obtains a sample of signals in channel 1 through condenser 74 and resistor 75. The function of condenser 74 is to prevent the flow of direct current between the grid circuits of tubes in the input stage of channel 1 and tube V12. The purpose of resistor 75 is to furnish a direct current grid return for tube V13 and to serve as a gain control for tube V12.

The cue circuit also obtains a sample of the signals in channel 2 through condenser 76 and resistor 77. This resistor and condenser serve the same purpose in connection with tube V13 as described above with respect to V12. Resistor 78 is a variable resistor with one end connected to the cathode of tube V12 and the other end connected to the cathode of tube V13. Movable arm *78a* is for varying the value of resistor 79 connected to ground. The function of resistor 78 is to balance tubes V12 and V13. The plate of tube V12 is connected to one end of the primary winding of transformer 79, while the plate circuit of tube V13 is connected to the other end of the primary winding of this transformer. The primary center of transformer 79 is connected to the power supply (B+) 80. Tubes V12 and V13 compose a balanced modulator circuit which by its design will eliminate in-phase signals, in this instance program signals, from its output circuit.

One end of the secondary winding of transformer 79 is connected through resistor 81 to the grid of a tube or semi-conductor in the audio output stage of channel 1. The other end of the secondary is connected through resistor 82 to the grid of a tube or semi-conductor in the audio output stage of channel 2. The center tap of the secondary winding of transformer 79 is connected to ground 83. The tone burst signals, in this instance cue signals, of channel 1 are 180° out of phase with cue signals of channel 2, and as a sample from channels 1 and 2 are applied to the cue channel, they appear across the secondry winding of transformer 79. The tone burst or cue signals appearing at the secondary winding of transformer 79 is of opposite polarity from cue signals appearing at the grid of a tube or semi-conductor in the audio output stage of channel 1 and they are applied to the grid of that tube or semi-conductor through resistor 81. When the cue signals are applied to this grid, they are of opposite polarity from the cue signals arriving at that grid and are therefore eliminated.

Utilization of the passed cue signals for tripping or switching the tape recorder actuating mechanism is similar to the method and device described previously. It is readily apparent that obvious modifications to the secondary circuit of transformer 79 can be ecected without substantially changing the operation of the tone burst eliminator.

Figure 4:
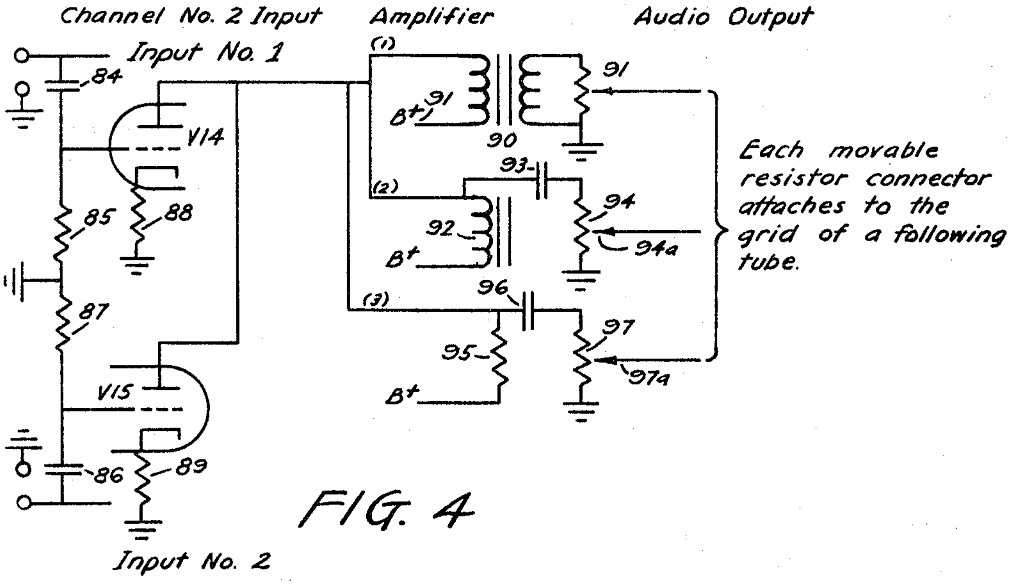
FIGURE 4 is still another alternative of the balanced modulator circuit for use in the apparatus described in FIGURE 1 and offering three separate variations for plate circuit loading.

FIGURE 4 illustrates another alternative circuit that can be used to accomplish the elimination of tone burst signals. Here the cue channel obtains a sample of signals in channel 1 through condenser 84. The purpose of this condenser is to couple signals from the input stage of channel 1 to the grid of tube V14. Resistor 85 provides a direct current grid return for tube V14. The cue channel also obtains a sample of signals from the input stage of channel 2 through condenser 86, which couples the signals from channel 2 to the grid of tube V15. Resistor 87 provides a direct current grid return for tube V15. Resistor 88 is connected from the cathode of tube V14 to ground and provides direct current bias voltage for that tube. Resistor 89 is connected from the cathode of tube V15 to ground and provides direct current bias voltage for that tube. The plates of tubes V14 and V15 are paralleled, these tubes composing a balanced modulator circuit which by its nature will eliminate out-of-phase signals from passing. The following enumerated paragraphs discuss three selected plate connections for tubes V14 and V15, however, it is obvious that there may be a variety of other connections than those particularly set out herein which will function equally as well.

(1) The primary winding of transformer 90 is connected from the paralleled plates of tubes V14 and V15 to the power supply (B+) 91. The secondary winding of transformer 90 is connected across resistor *91a* and one end of that resistor is connected to ground. The movable arm of contact of resistor *91a* is connected to the grid of the next tube in the cue amplifier.

(2) Choke coil 92 is connected from the plates of tubes V14 and V15 to the power supply (B+). The purpose of this choke is to furnish a plate load resistance for these tubes. Condenser 93 is connected from the plates of tubes V14 and V15 to one end of resistor 94, and the other end of that resistor is connected to ground.

The purpose of condenser 93 is to prevent the flow of direct current from the plates of tubes V14 and V15 to resistor 94. The movable arm 94a of that resistor is connected to the grid of the next tube in the cue amplifier.

(3) Resistor 95 is connected from the plates of tubes V14 and V15 to the power supply (B+) and furnishes a plate load resistance for these tubes. Condenser 96 is connected from the plates of tubes V14 and V15 to one end of a resistor 97 which is grounded. The movable contact 97a of resistor 97 is connected to the grid of the next tube in the cue amplifier. From this point on, the cue channel amplifier is identical to that set forth and described above concerning the preferred and alternative devices.

FIGURE 5 is still another alternative apparatus for accomplishing tone burst elimination. The input signals for channel 1 are applied between terminals 98 and 99, coupled through condenser 100 and directed across resistor 101. The purpose of condenser 100 is to prevent the flow of direct current between the grid circuits of tubes V16 and V17. Resistor 101 is to provide a direct current grid return for tube V16 and also to control the gain of that tube.

The input signals for channel 2 are applied between terminals 102 and 103, coupled through condenser 104 and directed across resistor 105. The purpose of condenser 104 is to prevent the flow of direct current between the grid circuits of tubes V18 and V17. The purpose of resistor 105 is to provide a direct current grid return for tube V18 and also to control the gain of that tube.

Resistor 106 is connected from the cathode of tube V16 to the cathode of tube V18 and has a movable contact arm 106a that is connected to ground. The purpose of this resistor is to balance the plate current flow between tubes V16 and V18. The primary winding of transformer 107 has one end connected to the plate of tube V16 and the other end connected to the plate of tube V18. The center tap on the primary of that transformer is connected to the power supply (B+). Transformer 107 is designed to achieve the following results:

(1) The signals arriving in the first half of the primary winding (plate circuit of tube V16 channel 1 input) will only appear in the secondary winding used for the channel 1 output.

(2) Signals arriving in the second half of he primary winding (plate circuit of tube V18 channel 2 input) will only appear in the secondary winding used for channel 2 output.

(3) In-phase signals, in this instance cue signals that arrive in the primary winding or windings from tubes V16 and V18 will cancel across the primary winding or windings and will not appear in any of the secondary windings.

The cue channel gathers a sample of the signals in the input stage of channel 1 through resistors 107 and 108. The cue channel also samples the signals in the input stage of channel 2 through resistors 109 and 108. One end of resistor 108 is connected to the junction of resistor 107 and 109, while the other end is connected to ground. The movable contact 108a of that resistor is connected to the grid of tube V17. Resistors 107, 108 and 109 serve as a voltage divider circuit (balanced modulator circuit) and prevent cross talk between channels 1 and 2. Resistor 108 also serves as a gain control for tube V17. Tone burst signals or cue signals arriving at the junction of resistors 107 and 109 are in phase, will not cancel across resistor 108 and therefore will be applied to the grid of tube V17. The remainder of the cue channel circuitry is identical to that set forth and described in the preferred embodiment of the invention and the numerous alternatives of that embodiment.

FIGURE 6 illustrates a final alternative circuit for acomplishing tone burst elimination to be disclosed. As is readily apparent, the balanced modulator circuit has been completely streamlined and drastically simplified by the substitution of a simple transformer to select and pass cue signals. The cue channel samples signals in the input stage of channel 1 through resistor 110 and applies those sampled signals to one-half of the primary winding of transformer 111. Similarly, the cue channel samples signals in the input stage of channel 2 through resistor 112 and applies these signals to the second half of the primary winding of transformer 111. The center tap on the primary winding of transformer 111 is connected to ground. The secondary winding of the transformer is connected to the grid of the amplifier stage in the cue circuit. When in-phase signals from channels 1 and 2 arrive at the primary winding of transformer 111, they mix and cancel across the primary winding of that transformer and do not appear in the secondary winding. However, cue signals (out-of-phase signals) from channels 1 and 2 arrive at the primary winding of transformer 111 and they do not cancel across that winding. They add electrically, appear across the secondary winding of the transformer and are applied to the grid of the amplifier stage of the cue channel.

While there have been shown and described and pointed out the fundamental novel features of the invention as applied to several modifications and alternatives, it will be understood that various omissions and substitutions and changes in the form and details of the devices illustrated and their operation may be made by those skilled in the art without departing from the spirit of the invention. It is the intention, therefore, to be limited only as indicated by the scope of the following claims:

We claim:

1. A multiple channel tape recorder playback circuit for eliminating tone burst signals in audio output circuits comprising: a source of electrical power; tape recorder actuating means; at least two input channels having program signal receiving means and cue signal receiving means; an amplifier stage following each input channel for amplifying program and cue signals received by said input channel; audio output circuit means for each input channel and amplifier stage, said audio output means receiving program signals from the amplifier stages for audible emission thereof; balanced modulator circuit means including means for differentiating program signals from cue signals, eliminating said program signals from said audio output circuit means and passing said cue signals through said balanced modulator circuit means, said balanced modulator circuit means sampling signals passing from the amplifier stages to the audio output stages and receiving these signals for differentiation, elimination and passage thereof; amplifying means for amplifying said passed cue signals; rectifying means for rectifying said passed and amplified cue signals; operationally biased grid bearing means wired to grid receive said passed, amplified and rectified cue signals and electrically biased for non-operation when said cue signals are grid received; audio output circuit interrupting means positioned prior to the audio output circuit and electrically receptive to interrupt and de-energize said output circuit when cue signals are received thereby precluding emission of any signal therefrom; and tape recorder actuator interrupting means including means for receiving cue signals from the balanced modulator and positioning these signals for biasing said actuator interrupting means in an interrupting condition, whereby program signals and cue signals are received by input channels, amplified and divided so that program signals are cancelled from the balanced modulator circuit and therefore pass on to the audio output circuit for audible emission and cue signals are passed through the balanced modulator circuit for eventual audio interruption and tape recorder actuator interruption biasing operations.

2. A multiple channel tape recorder playback circuit for eliminating tone burst signals in audio output circuits comprising; a source of electrical power; tape recorder actuating means; at least two input channels having program signal receiving means and cue signal receiving means; an amplifier stage following each input channel for amplifying program and cue signals received by said input channels; audio output circuit means for each input channel and amplifier stage, said audio output circuit means receiving program signals from the amplifier stages for audible emission thereof; balanced modulator circuit means for differentiating program signals from cue signals, eliminating said program signals from said audio output circuit means and passing said cue signals through said balanced modulator circuit means, said balanced modulator circuit means sampling signals passing from the amplifier stages to the audio output stages and receiving these signals for differentiation, elimination and passage thereof; operationally biased grid bearing means receiving said passed, amplified and rectified cue signals and electrically biased for non-operation when said cue signals are grid received; audio output circuit interrupting means positioned prior to the audio output circuit and electrically receptive to interrupt and de-energize said output circuit when cue signals are received; and tape recorder actuator interrupting means, said tape recorder actuator interrupting means including means for receiving cue signals from the balanced modulator and positioning these signals for biasing said actuator interrupting means in an interrupting condition, whereby program signals and cue signals are received by input channels, amplified and divided so that program signals are cancelled from the balanced modulator circuit and therefore pass on to the audio output circuit for audible emission and cue signals are passed through the balanced modulator circuit for eventual audio interruption and tape recorder actuator interruption biasing operations.

3. A multiple channel tape recorder playback circuit for eliminating tone burst signals in audio output circuits comprising: a source of electrical power; tape recorder actuating means; a plurality of input channels having out-of-phase program signal receiving means and in-phase cue signal receiving means; an amplifier stage following each input channel for amplified program and cue signals received by said input channels; audio output circuits for each input channel and amplifier stage, said circuits receiving program signals in each channel for audible emission thereof; balanced modulator circuit means including means for eliminating out-of-phase program signals and adding and passing in-phase cue signals, said balanced modulator circuit means sampling all signals passing from the amplifier stages to the audio output stages of each channel and receiving these program and cue signals for the elimination and passage thereof; amplifying means for amplifying said added and passed cue signals; rectifying means for rectifying said added, passed and amplified cue signals; a normally baised-beyond-cut-off grid bearing means receiving said added, passed, amplified and rectified cue signals and electrically biased for conduction when said cue signals are received; audio output circuit interrupting means positioned prior to the audio output circuit and electrically receptive to operate, interrupt and de-energize said output circuit when said cue signals are received thereby; and tape recorder actuator interrupting means including means for receiving cue signals from said balanced modulator means and positioning these signals for biasing said tape recorder actuator interrupting means in a conducting and interrupting condition thereby out-of-phase program signals and in-phase cue signals are received by input channels, amplified and divided so that out-of-phase program signals are cancelled from the balanced modulator circuit and therefore passed on to the audio output circuit for audible emission and in-phase cue signals are added and passed through the balanced modulator circuit for eventual audio interruption and tape recorder actuator interruption biasing operations.

References Cited

UNITED STATES PATENTS

| | | | |
|---|---|---|---|
| 2,499,587 | 3/1950 | Kellogg | 179—100.3 |
| 2,780,679 | 2/1957 | Vandivere | 179—100.2 X |

BERNARD KONICK, *Primary Examiner.*

R. F. CARDILLO, Jr., *Assistant Examiner.*

U.S. Cl. X.R.

179—100.1